US011115909B2

(12) United States Patent
Zander et al.

(10) Patent No.: US 11,115,909 B2
(45) Date of Patent: Sep. 7, 2021

(54) METHOD FOR PROVIDING BAND SCANNING PRIORITIZATION, AND A MOBILE COMMUNICATIONS DEVICE INCORPORATING THE METHOD

(71) Applicant: Sony Mobile Communications Inc., Tokyo (JP)

(72) Inventors: Olof Zander, Södra Sandby (SE); Rickard Ljung, Helsingborg (SE)

(73) Assignee: SONY MOBILE COMMUNICATIONS INC.

( * ) Notice: Subject to any disclaimer, the term of this patent is extended or adjusted under 35 U.S.C. 154(b) by 172 days.

(21) Appl. No.: 16/080,329

(22) PCT Filed: Mar. 3, 2017

(86) PCT No.: PCT/EP2017/055051
§ 371 (c)(1),
(2) Date: Aug. 28, 2018

(87) PCT Pub. No.: WO2017/153286
PCT Pub. Date: Sep. 14, 2017

(65) Prior Publication Data
US 2020/0305067 A1 Sep. 24, 2020

(30) Foreign Application Priority Data

Mar. 11, 2016 (EP) ..................................... 16159875

(51) Int. Cl.
*H04W 48/16* (2009.01)
*H04W 8/18* (2009.01)
(Continued)

(52) U.S. Cl.
CPC ........... *H04W 48/16* (2013.01); *H04W 8/183* (2013.01); *H04W 48/18* (2013.01); *H04W 88/06* (2013.01)

(58) Field of Classification Search
CPC ....... H04W 4/02; H04W 4/025; H04W 4/026; H04W 4/029; H04W 48/18; H04W 48/20;
(Continued)

(56) References Cited

U.S. PATENT DOCUMENTS 9,125,146 B1   9/2015 Edara et al.
2007/0004405 A1  1/2007 Buckley
(Continued)

FOREIGN PATENT DOCUMENTS

EP   1703756 A1   9/2006
EP   1863313 A1   12/2007

OTHER PUBLICATIONS

International Search Report and Written Opinion from counterpart International Patent Application No. PCT/EP2017/055051, dated May 2, 2017.
(Continued)

Primary Examiner — Jean A Gelin
(74) Attorney, Agent, or Firm — Tucker Ellis LLP

(57) ABSTRACT

The disclosure relates to a method for providing band scanning prioritization in a mobile communications device, the mobile communications device (100) being associated with a user, the method (200) comprising: retrieving (202), in a communication entity (106) information pertaining to present time and intended location of the user at a specific time from an application entity (104), determining (204), in the communication entity (106), a probable location of the mobile communications device (100) taking into account the information pertaining to present time and intended location of the user at a specific time, and performing in the modem entity (102) and/or the communication entity (106) (208) a band scanning prioritization taking into account the probable location of the mobile communications device (100). The disclosure also relates to a mobile communications device (100).

10 Claims, 2 Drawing Sheets

(51) Int. Cl.
*H04W 48/18* (2009.01)
*H04W 88/06* (2009.01)

(58) Field of Classification Search
CPC ....... H04W 8/18; H04W 8/183; H04W 48/16; H04W 88/06
See application file for complete search history.

(56) References Cited

U.S. PATENT DOCUMENTS

| | | |
|---|---|---|
| 2010/0099403 A1 | 4/2010 | Kim |
| 2010/0234021 A1 | 9/2010 | Ngai et al. |
| 2013/0007039 A1 | 1/2013 | Edara |
| 2013/0012229 A1* | 1/2013 | Itagaki .................. G01S 5/14 455/456.1 |
| 2013/0079001 A1 | 3/2013 | Edara |
| 2014/0066061 A1* | 3/2014 | Lou ..................... H04W 48/16 455/434 |
| 2015/0304484 A1* | 10/2015 | Halmstad ............. H04W 76/10 455/419 |
| 2015/0327039 A1* | 11/2015 | Jain ...................... H04W 4/023 455/404.2 |
| 2016/0006531 A1* | 1/2016 | Kumar ................ H04J 11/0086 455/434 |
| 2016/0073417 A1* | 3/2016 | Sebeni ................... H04L 12/00 370/329 |

OTHER PUBLICATIONS

Office Action from corresponding European Application No. 16159875.0, dated Aug. 30, 2018.

* cited by examiner

METHOD FOR PROVIDING BAND SCANNING PRIORITIZATION, AND A MOBILE COMMUNICATIONS DEVICE INCORPORATING THE METHOD

FIELD OF INVENTION

Various embodiments relate to a method for providing band scanning prioritization in a mobile communications device, the mobile communications device being associated with a user, the mobile communications device comprising: a modem entity adapted to connect the mobile communications device to a cellular communications network, and an application entity adapted to run application software, the application software including software having information pertaining to present time and intended location of the user at a specific time.

The invention also relates to a mobile communications device being associated with a user, the mobile communications device comprising: a modem entity adapted to connect the mobile communications device to a cellular communications network, and an application entity adapted to run application software, the application software including software having information pertaining to present time and intended location of the user at a specific time.

TECHNICAL BACKGROUND

A mobile communications device, such as a mobile phone, typically supports a large number of frequency bands or channels for wireless communication with a cellular network.

The wireless communication may e.g. be based on standards such as LTE, GSM, UMTS, and WCDMA. A common feature of cellular networks according to these present and probably also for future standards, is that they work with a large range of frequency bands (sometimes referred to as channels).

In short the standards referred to are:

LTE (Long-Term Evolution) commonly marketed as 4G LTE (fourth generation LTE) is a standard for wireless communication of high-speed data for mobile phones and data terminals. Different LTE frequencies and bands used in different countries will mean that only multi-band phones will be able to use LTE in all countries where it is supported.

GSM (Global System for Mobile Communications, originally Groupe Special Mobile), is a standard developed by the European Telecommunications Standards Institute (ETSI) to describe the protocols for second-generation (2G) digital cellular networks used by mobile phones.

UMTS (Universal Mobile Telecommunications System) is a third generation mobile cellular system for networks based on the GSM standard. Developed and maintained by the 3GPP (3rd Generation Partnership Project). UMTS uses wideband code division multiple access (W-CDMA) radio access technology to offer greater spectral efficiency and bandwidth to mobile network operators.

When a mobile phone has been switched off or if the mobile phone has been set in flight-mode (i.e. disconnected from the cellular network mentioned above) the mobile phone needs to reconnect to a cellular network. When making a so-called full band scan with the purpose to find a mobile radio access network to utilize, this can take long time leaving the end user with bad user experience since no mobile connection is available before a suitable mobile network is found. In order to shorten the time it takes to connect to the network there exist today some different band scan order approaches.

One method is to use a random band scan order. The time it takes to connect to the network will be the result of being lucky or not.

It is e.g. known to provide a predefined band scan order, based on 3GPP defined band number. This method is commonly used by major modem vendors. The time it takes to connect is dependent upon the band numbers position in the list. If the band to be used happens to be early in the list the mobile phone may connect fairly quickly but if the band to be used is late in the list it will take a long time to connect. Some users may over and over find that it will take a long time to connect to the network.

This issue has in some respect been addressed by providing a predefined band scan order based on country/operator/ region where the device is likely to be sold. This may provide a shorter time to achieve a connection to the network when the user is in his home area. However, after an intercontinental flight, it may take a long time to connect to the network since all the frequency bands of the home area are prioritized. An alternative to the predefined list based on country/operator/region is to provide a dynamic band scan order based on information on the SIM card inserted in the mobile device. This may e.g. be used to provide a scanning of frequency bands based on the frequency bands associated with the operator and its roaming partners. However, this method may also in some cases, such as after an intercontinental flight, result in a long time to connect to the network since all the frequency bands of the home area are prioritized.

SUMMARY OF INVENTION

It is an object of the invention to provide an improved method for providing band scanning prioritization in a mobile communications device.

This object has been achieved by a method for providing band scanning prioritization in a mobile communications device, the mobile communications device being associated with a user.

The mobile communications device comprises a modem entity, an application entity, and a communication entity.

The modem entity is adapted to connect the mobile communications device to a cellular communications network. The application entity is adapted to run application software, the application software including software having information pertaining to present time and intended location of the user at a specific time. The communication entity is adapted to provide communication between the modem entity and the application entity.

The method comprises:

retrieving, in a communication entity information pertaining to present time and intended location of the user at a specific time from an application entity, determining, in the communication entity, a probable location of the mobile communications device taking into account the information pertaining to present time and intended location of the user at a specific time, and performing in the modem entity and/or the communication entity a band scanning prioritization taking into account the probable location of the mobile communications device.

Mobile operators typically have been allocated different frequency bands from regulatory authorities. The frequency allocations could to some extent be connected to different locations, such as continents, counties, cities etc. Hence, different locations are typically associated with different frequency bands. By including a communication entity retrieving time, such as date and clock hour and intended location information from the application entity it is possible to determine a probable location. This way the modem entity may accomplish a suitably prioritized band scanning resulting in that the user will, compared to the prior art methods, have a significantly greater possibility of experiencing a short time to achieved connection. Compared to the prior art methods, the risk of experiencing a long time, due to unsuitable choice of scan order, to achieved connection is also reduced.

The determination of probable location may be performed when the mobile communications device is turned off. The determination of probable location may be performed when the mobile communications device is turned on. The determination of probable location may be performed in response to the mobile communications device being set in a non-connected but still turned on state, such as a being set in flight-mode.

The information concerning which frequency bands are associated with different locations may be stored in the mobile communications device when the mobile communications device is produced. Alternatively, the information may be updated at a later time. The information may e.g. be retrieved in response to information being broadcasted by an operator or vendor. The information may also be retrieved in response to the application entity and communication entity identifying that an intended location in a nearby time is in a geographical area of the network to which area the information related to frequency bands is not present or not recently updated.

It may be noted that the modem entity, application entity and communication entity in this application are referred to as functional blocks. They may be provided fully or partly on the same physical hardware or fully or partly in separate physical hardwares. They may be implemented fully or partly in software or fully or partly in hardware.

The modem entity and/or communication entity has access to a list of frequency bands each associated with information concerning a location for use of respective frequency band. This list may be stored in a memory of the modem hardware or in a memory to which the modem entity and/or communication entity has access to.

It may also be noted that the method above may be implemented before, after or intertwined with other prioritization methods. In one alternative, the modem entity e.g. first tries to access the last used network and thereafter the method involving determination of probable location is used.

In this application a cellular network or mobile network is a communication network where the last link is wireless. The network is typically distributed over land areas called cells, each served by at least one fixed-location transceiver, known as a cell site or base station. This base station provides the cell with the network coverage which can be used for transmission of voice, data and others. In a cellular network, each cell uses a different set of frequencies from neighbouring cells, to avoid interference and provide guaranteed bandwidth within each cell.

Preferred embodiments appear in the dependent claims and in the description.

The cellular communications network may be a cellular network where at least a last link in which the mobile communications device is connected to the cellular network is wireless using radio frequency communication.

The wireless communication may e.g. be based on standards such as LTE, GSM, UMTS, and WCDMA.

A common feature of cellular networks according to present and probably also for future standards, is that they work with a large range of frequency bands (sometimes referred to as channels).

In short the standards referred to are:

GSM (Global System for Mobile Communications, originally Groupe Spécial Mobile), is a standard developed by the European Telecommunications Standards Institute (ETSI) to describe the protocols for second-generation (2G) digital cellular networks used by mobile phones.

UMTS (Universal Mobile Telecommunications System) is a third generation mobile cellular system for networks based on the GSM standard. Developed and maintained by the 3GPP (3rd Generation Partnership Project). UMTS uses wideband code division multiple access (WCDMA) radio access technology to offer greater spectral efficiency and bandwidth to mobile network operators.

LTE (Long-Term Evolution) commonly marketed as 4G LTE (fourth generation LTE) is a standard for wireless communication of high-speed data for mobile phones and data terminals. Different LTE frequencies and bands used in different countries will mean that only multi-band phones will be able to use LTE in all countries where it is supported.

The mobile communications device may be adapted to store information pertaining cellular communications networks to which the mobile communications device has been connected, and wherein the modem entity and/or communication entity when performing the band scanning prioritization takes into account the probable location of the mobile communications device and the information pertaining cellular communications networks to which the mobile communications device has been connected.

This way the probability to find a suitable band is further improved. The information pertaining to cellular communications networks to which the mobile communications device has been connected may, but need not, in one embodiment be associated with information about in what location the mobile communications device was when it was connected to respective network. If the information about previous networks is not associated with location information, there will basically be two lists of probable frequency bands; one from the list of previous networks and one based on the probable location determination. If the list of previous networks is associated with location information, the list of probable frequency bands may be even more strongly prioritised by using the probable location in combination with the frequency band(s) previously used in that location.

The mobile communications device may be adapted to retrieve or store information pertaining to a specific band scan order based on an identification of a cellular communications network operator based on information on a SIM card inserted in said mobile communications device, and wherein the modem entity and/or communication entity when performing the band scanning prioritization takes into account the probable location of the mobile communications device and the information pertaining to a specific band scan order based on an identification of a cellular communications network operator based on information on a SIM card inserted in said mobile communications device.

This way the probability to find a suitable band is further improved. The information pertaining to band scan order based on SIM card information may, but need not, in one embodiment be associated with information about a certain band scan order for a given determined location. If the band scan order based on SIM card information is not associated with location information, there will basically be two lists of probable frequency bands; one from the list based on the SIM card information and one based on the probable location determination. If the band scan order from the SIM card information is associated with location information, the list of probable frequency bands may be even more strongly prioritised by using the probable location in combination with the frequency band(s) in the SIM based scan band order of that specific location.

It may also be noted that the embodiment involving previous networks and the SIM card information based band scan order may be used in combination with each other. As is the case for respective embodiment, the information from the previous network, SIM card based scan order and the probable location information, may as a first improvement be used side by side or one after the other or as a further improvement be used true combination with each other. A true combination may e.g. be that after determination of a probable location the list of previous networks used at this specific location is arranged in a specific order based on the SIM card information, or vice versa.

It is also an object of the invention to provide a mobile communications device incorporating an improved method for providing band scanning prioritization.

This object has been achieved by a mobile communications device being associated with a user, the mobile communications device comprising:

a modem entity adapted to connect the mobile communications device to a cellular communications network, an application entity adapted to run application software, the application software including software having information pertaining to present time and intended location of the user at a specific time, a communication entity adapted to provide communication between the modem entity and the application entity, and the communication entity being adapted to retrieve information pertaining to present time and intended location of the user at a specific time from the application entity, the communication entity being adapted to determine a probable location of the mobile communications device taking into account the information pertaining to present time and intended location of the user at a specific time, the modem entity and/or communication entity being adapted to perform a band scanning prioritization taking into account the probable location of the mobile communications device.

The advantages of the different features have been discussed above in detail in relation to the method for providing band scanning prioritization in a mobile communications device and reference is made thereto.

Preferred embodiments of the mobile communications device appear in the dependent claims and in the description. The advantages of the different features appearing in the different dependent claims have been discussed above in detail in relation to the method for providing band scanning prioritization in a mobile communications device and reference is made thereto.

The cellular communications network may be a network where at least a last link in which the mobile communications device is connected to the cellular network is wireless using radio frequency communication.

The mobile communications device may be adapted to store information pertaining cellular communications networks to which the mobile communications device has been connected, and wherein the modem entity and/or communication entity when performing the band scanning prioritization takes into account the probable location of the mobile communications device and the information pertaining cellular communications networks to which the mobile communications device has been connected.

The mobile communications device may be adapted to retrieve or store information pertaining to a specific band scan order based on an identification of a cellular communications network operator based on information on a SIM card inserted in said mobile communications device, and wherein the modem entity and/or communication entity when performing the band scanning prioritization takes into account the probable location of the mobile communications device and the information pertaining to a specific band scan order based on an identification of a cellular communications network operator based on information on a SIM card inserted in said mobile communications device.

BRIEF DESCRIPTION OF THE DRAWINGS

The invention will by way of example be described in more detail with reference to the appended schematic drawings, which show a presently preferred embodiment of the invention.

DETAILED DESCRIPTION OF PREFERRED EMBODIMENTS

Figure 1:
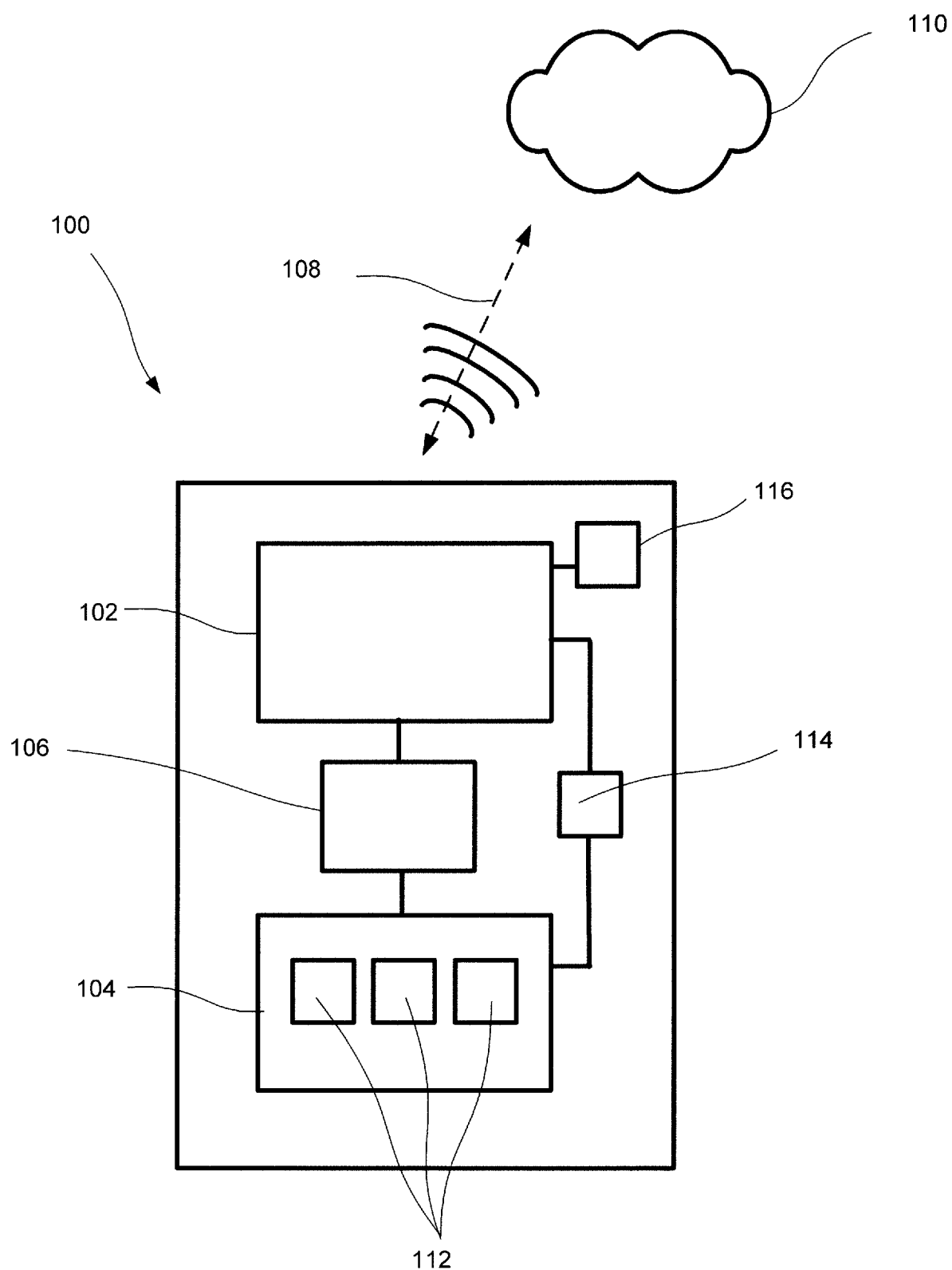
FIG. 1 is a schematic drawing of a mobile communications device.
Figure 2:
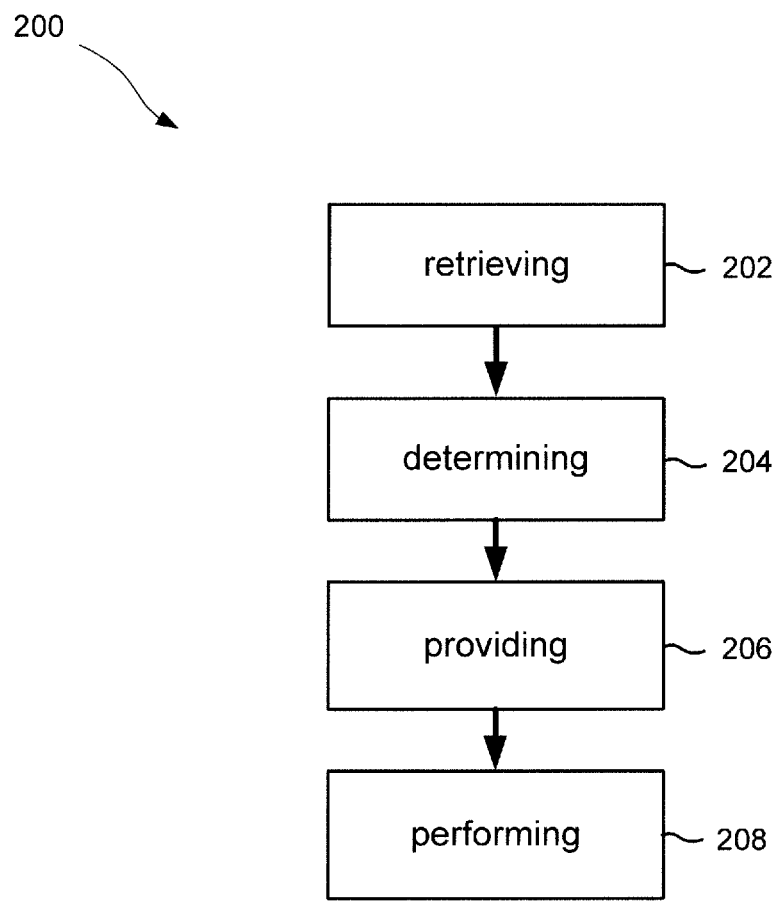
FIG. 2 is a flow chart illustrating a method for providing band scanning prioritization in a mobile communications device.

A method for providing band scanning prioritization in a mobile communications device will in the following be discussed with reference to FIGS. 1 and 2. FIG. 1 illustrates a mobile communications device 100 being associated with a user. The method 200 for providing band scanning prioritization is correspondingly illustrated in FIG. 2.

In FIG. 1, the mobile communications device 100 is illustrated as a mobile phone of a user. The mobile communications device 100 comprises a modem entity 102, an application entity 104 and a communication entity 106. The communication entity 106 is adapted to provide communication between the modem entity 102 and the application entity 104.

The modem entity 102 is adapted to connect 108 the mobile communications device 100 to a cellular communications network 110. The modem entity 102 may include one or more modems for wireless communication, for example Wi-Fi, GSM/WCDMA/LTE, and possibly also other functions such as GPS receiver. The external communication controlled by the modem entity 102 typically follows standardized protocols from IEEE, 3GPP etc. and is mainly targeted to setup, maintain and release communication links which handles application layer IP based data communication. The modem entity 102 is adapted to perform band scanning.

The application entity 104 may include an operating system, for example windows/android/IOS, and a set of software, also referred to as applications software or Apps which may be executed within that operating system. The operating system and the software applications may be controlling the IP based data, to be transferred via the modem entity 102, as will be discussed below.

The application entity 104 is further adapted to run application software 112 which includes software having information pertaining to present time and intended location of the user at a specific time.

The communication entity 106 is adapted to determine a probable location of the mobile communications device 100 taking into account the information pertaining to present time and intended location of the user at a specific time.

The communication entity 106 is further adapted to provide information about the probable location of the mobile communications device to the modem entity 102.

The communication entity 106 is further adapted to retrieve information pertaining to present time and intended location of the user at a specific time from the application entity 104 as will be described below.

The modem entity 102 is further adapted to perform a band scanning prioritization taking into account the probable location of the mobile communications device 100.

The application software 112 having information pertaining to present time and intended location of the user at a specific time may be a calendar software comprising calendar data. The calendar software may thereby comprise software that provide a user with an electronic version of a calendar. The calendar software may also comprise an appointment book, an address book, and/or a contact list. The calendar software may be a local software package designed for individual use, for example Microsoft Outlook without Exchange Server, or Windows Calendar, or may be a networked software package that allows for the sharing of information between users, for example Windows Live Calendar, Google Calendar, or Microsoft Outlook with Exchange Server. Hence, the calendar software may be used to manage the time schedule of a user. The calendar software of a device, such as the mobile communications device, may be synchronised with one or several online accounts that include calendars, for example, Google™ or Xperia™, Facebook.

The application software 112 may comprise an appointment book, address book, and/or contact list providing information pertaining to present time and intended location of the user at a specific time.

The application software 112 may be an email software, a text messaging software or a software for providing social networking such as a chat program, providing any kind of communication over a cellular communications network or the Internet whereby real-time transmission of text messages from sender to receiver is provided. The skilled person in the art thereby understands that different application software 112 may be used for providing information pertaining to present time and intended location of the user at a specific time. The browsing history web browsing software may be used for providing information pertaining to present time and intended location of the user at a specific time. Alternatively or in combination application software such as "Google now" providing communication functionality using Google cloud services may be used to determine a current and future location of a mobile communications device, e.g. by understanding regular behaviour, correlation with email information etc. In addition information from a plurality of different application software 112 may be used to estimate a present time and intended location of the user at a specific time. In other words, information in the one or several application software, for example the calendar software discussed above, may be used to provide a location estimate based on account information, travel itinerary etc.

Next, the method 200 for band scanning prioritization by the mobile communications device 100 will be discussed. The method 200 comprises the communication entity 106 retrieving 202 information pertaining to present time and intended location of the user at a specific time from the application entity 104. The communication entity 106 determines 204 a probable location of the mobile communications device 100 taking into account the information pertaining to present time and intended location of the user at a specific time. The communication entity 106 further provides 206 information about the probable location of the mobile communications device 100 to the modem entity 102. The modem entity 102 as such, or the communication entity 106 or the two entities in combination, then perform 208 a band scanning prioritization taking into account the probable location of the mobile communications device 100.

The cellular communications network 110 may be a network where at least a last link in which the mobile communications device 100 is connected to the cellular network 200 is wireless using radio frequency communication.

The mobile communications device 100 may be adapted to store information pertaining cellular communications networks 110 to which the mobile communications device 100 has been connected, and wherein the modem entity 102 when performing the band scanning prioritization takes into account the probable location of the mobile communications device 100 and the information pertaining cellular communications networks 110 to which the mobile communications device has been connected. The information pertaining to cellular communications networks 110 to which the mobile communications device 100 has been connected may be stored on a memory 114. The memory 114 may be a non-transitory memory.

The same memory 114 or an additional memory may further be adapted to store application software and/or storing calendar data.

The mobile communications device 100 may be adapted to retrieve or store information pertaining to a specific band scan order based on an identification of a cellular communications network operator based on information on a subscriber identity module or subscriber identification module (SIM) card 116 inserted in the mobile communications device 100, see FIG. 1. The modem entity 102 may thereby when performing the band scanning prioritization take into account the probable location of the mobile communications device 100 and the information pertaining to a specific band scan order based on an identification of a cellular communications network operator based on information on a SIM card 116 inserted in the mobile communications device 100.

The SIM card 116 is an integrated circuit chip or card that may store the international mobile subscriber identity (IMSI) number and its related key, which are used to identify and authenticate subscribers on mobile communications devices such as mobile phone and computers.

The mobile communications device may thereby utilize information on the SIM card to provide information on which frequency bands that have priority and/or have been used previously.

As an example, a mobile communications device 100 may need to find a new communications network 110 to camp when for instance starting the mobile communications device 100 from flight mode after a flight travel. After starting the modem entity 102 of the mobile communications device 100, the communication entity 106 may, as discussed in detail above, retrieve information pertaining to present time and intended location of the user at a specific time from the application entity 104 of the mobile communications device 100. This retrieved information may, for example, be acquired from travelling itineraries or similar data provided in the one or several of the software applications 116 as described above. The information may, for example, provide which country, and even city, to which the user is likely to have flown to. Utilizing this information reduces the number of bands that need to be scanned by the modem entity 192 in order to connect/reconnect the mobile communications device 100 to a cellular communications network 110. The communication entity 106 may thereby provide information about the probable location of the mobile communications device 100 to the modem entity 102 such that the modem entity may only perform band scanning for prioritized bands. In other words, the retrieved information on probable location may be sent back to the modem entity 102 such that a suitable band scan is initiated e.g. based on a typical country based frequency band utilization register. The band scanning can therefore be made much faster.

To this end, the mobile entity may perform a new full band scan in order to connect/reconnect the mobile communications device 100 to a cellular communications network 110 if no information is retrieved by the communication entity 106, or if the information pertaining to present time and intended location of the user at a specific time retrieved is contradictory by its nature.

It is contemplated that there are numerous modifications of the embodiments described herein, which are still within the scope of the invention as defined by the appended claims.

The mobile communications device 100 has above been described as a mobile phone. Alternatively the mobile communications device may be a tablet, personal digital assistant (PDA), smart watch, smart bracelets, or wearable electronic that is associated with a user and adapted to connect to a cellular communications network.

The invention claimed is:

1. A method for providing band scanning prioritization in a mobile communications device, the mobile communications device being associated with a user, the method comprising:

retrieving, in a communication entity of the mobile communications device, information pertaining to present time and an intended future location of the user at a specific time in the future from an application entity of the mobile communications device, wherein the application entity runs application software accessing data from which the intended future location of the user at the specific time in the future is determined, the intended future location of the user at the specific time in the future differing from a current location of the user at the present time, and before the mobile communications device is set in a non-connected but still turned on state or the mobile communications device is switched to a turned off state:

determining, in the communication entity, a probable future location to which the mobile communications device is predicted to move between the time (i) the mobile communications device is set in the non-connected but still turned on state or the mobile communications device is switched to the turned off state and (ii) the mobile communication device is returned to a connected state, the determining taking into account the information pertaining to present time and the intended future location of the user at the specific time in the future, and establishing, in at least one of a modem entity of the mobile communications device or the communication entity of the mobile communications device, a band scanning prioritization taking into account the probable future location of the mobile communications device.

2. The method according to claim 1, wherein the cellular communications network is a network where at least a last link in which the mobile communications device is connected to the cellular communications network is wireless using radio frequency communication.

3. The method according to claim 1, wherein the mobile communications device stores information pertaining to cellular communications networks to which the mobile communications device has been connected, and the establishing the band scanning prioritization takes into account the probable future location of the mobile communications device and the information pertaining to cellular communications networks to which the mobile communications device has been connected.

4. The method according to claim 1, wherein the mobile communications device retrieves or stores information pertaining to a specific band scan order based on an identification of a cellular communications network operator based on information on a SIM card inserted in said mobile communications device, and the establishing the band scanning prioritization takes into account the probable future location of the mobile communications device and the information pertaining to the specific band scan order based on the identification of the cellular communications network operator based on information on the SIM card inserted in said mobile communications device.

5. The method according to claim 1, wherein the mobile communications device stores information pertaining to cellular communications networks to which the mobile communications device has been connected, wherein the mobile communications device retrieves or stores information pertaining to a specific band scan order based on an identification of a cellular communications network operator based on information on a SIM card inserted in said mobile communications device, and the establishing the band scanning prioritization takes into account the probable future location of the mobile communications device, the information pertaining to cellular communications networks to which the mobile communications device has been connected, and the information pertaining to the specific band scan order based on the identification of the cellular communications network operator based on information on the SIM card inserted in said mobile communications device, the information pertaining to cellular communications networks to which the mobile communications device has been connected at this probable future location arranged in a specific order based on information on the SIM card.

6. A mobile communications device being associated with a user, the mobile communications device comprising:

a modem entity adapted to connect the mobile communications device to a cellular communications network, an application entity adapted to run application software, the application software configured to access data having information pertaining to present time and an intended future location of the user at a specific time in the future, wherein the intended future location of the user at the specific time in the future, which is determined from the data, is different from a current location of the user at the present time, and a communication entity adapted to provide communication between the modem entity and the application entity, and the communication entity adapted to retrieve the information pertaining to present time and the intended future location of the user at the specific time in the future from the application entity, the communication entity adapted to determine, before the mobile communications device is set in a non-connected but still turned on state or the mobile communications device is switched to a turned off state, a probable future location to which the mobile communications device is predicted to move between the time (i) the mobile communications device is set in the non-connected but still turned on state or the mobile communications device is switched to the turned off state and (ii) the mobile communication device is returned to a connected state, taking into account the information pertaining to present time and the intended future location of the user at the specific time in the future, and at least one of the modem entity or the communication entity adapted to establish, before the mobile communications device is set in the non-connected but still turned on state or the mobile communications device is switched to the turned off state, a band scanning prioritization taking into account the probable future location of the mobile communications device.

7. The mobile communications device according to claim 6, wherein the cellular communications network is a network where at least a last link in which the mobile communications device is connected to the cellular network is wireless using radio frequency communication.

8. The mobile communications device according to claim 6, wherein the mobile communications device is adapted to store information pertaining to cellular communications networks to which the mobile communications device has been connected, and at least one of the modem entity or communication entity adapted to establish the band scanning prioritization taking into account the probable future location of the mobile communications device and the information pertaining to cellular communications networks to which the mobile communications device has been connected.

9. The mobile communications device according to claim 6, wherein the mobile communications device is adapted to retrieve or store information pertaining to a specific band scan order based on an identification of a cellular communications network operator based on information on a SIM card inserted in said mobile communications device, and at least one of the modem entity or communication entity adapted to establish the band scanning prioritization taking into account the probable future location of the mobile communications device and the information pertaining to the specific band scan order based on the identification of the cellular communications network operator based on information on the SIM card inserted in said mobile communications device.

10. The mobile communications device according to claim 6, wherein the mobile communications device is adapted to store information pertaining to cellular communications networks to which the mobile communications device has been connected, wherein the mobile communications device is adapted to retrieve or store information pertaining to a specific band scan order based on an identification of a cellular communications network operator based on information on a SIM card inserted in said mobile communications device, and at least one of the modem entity or communication entity adapted to establish the band scanning prioritization taking into account the probable future location of the mobile communications device, the information pertaining to cellular communications networks to which the mobile communications device has been connected, and the information pertaining to the specific band scan order based on the identification of the cellular communications network operator based on information on the SIM card inserted in said mobile communications device, the information pertaining to cellular communications networks to which the mobile communications device has been connected at this probable future location arranged in a specific order based on information on the SIM card.

* * * * *